(No Model.)
F. L. BARTLETT.
APPARATUS FOR REFINING FUME.
No. 415,186. Patented Nov. 19, 1889.
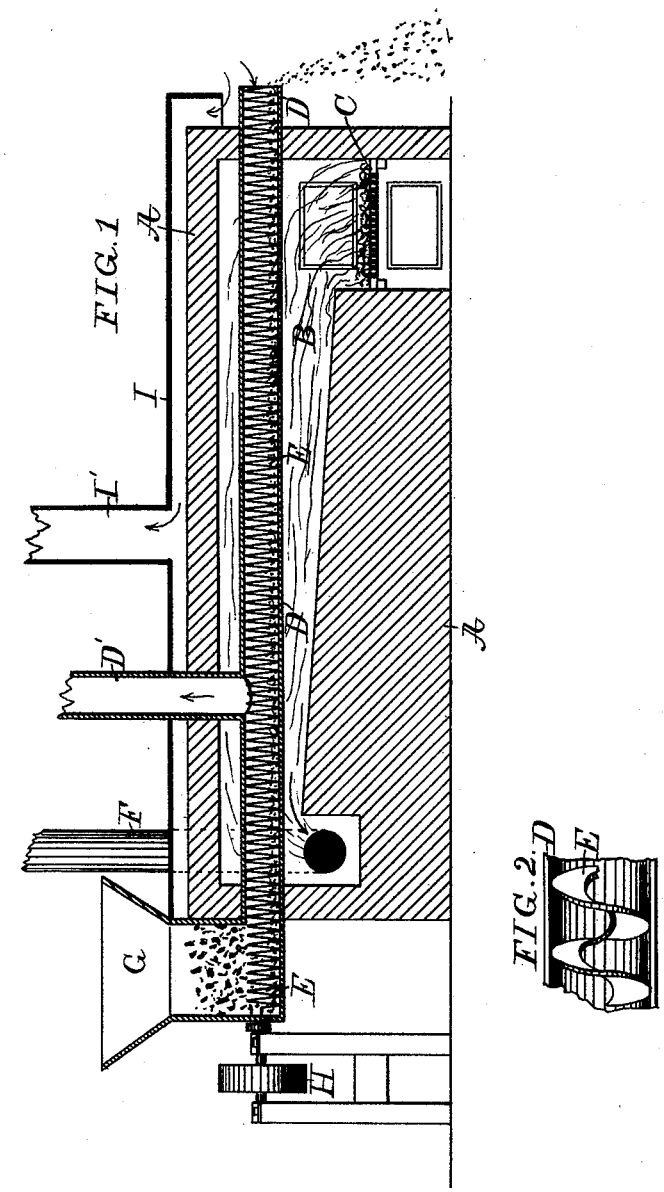
Witnesses
Severance
R. Deane
Inventor
Frank L. Bartlett
by S. W. Bates
his atty.

UNITED STATES PATENT OFFICE.

FRANK L. BARTLETT, OF PORTLAND, MAINE.

APPARATUS FOR REFINING FUME.

SPECIFICATION forming part of Letters Patent No. 415,186, dated November 19, 1889.

Application filed March 13, 1889. Serial No. 303,068. (No model.)

*To all whom it may concern:*

Be it known that I, FRANK L. BARTLETT, residing at Portland, in the county of Cumberland and State of Maine, have invented certain new and useful Improvements in Apparatus for Refining Fume; and I do hereby declare that the following is a full, clear, and exact description of the invention, which will enable others skilled in the art to which it appertains to make and use the same.

My invention relates to apparatus for the manufacture of paint-pigments; and the object of the invention is to refine and whiten the fume collected in the operation of treating lead, zinc, and antimony ores by smelting or roasting processes, and to condense or reduce the volume of such fumes. It is well known that in these operations fume is often collected in condensers, bags, or screens, which, by reason of its dark color, must be resmelted or revolatilized in order to render it white and pure. The dark color of this fume arises from the presence of various substances—such as the rare metals, cadmium, selenium, vanadium, and tellurium, and also sulphur compounds, carbonaceous matter, and acids. The base of the fume or pigment is, however, either lead, zinc, or antimony, or compounds of these metals in the form of oxides, sulphurets, sulphides, or mixtures of the above. These fumes, when formed and collected by most of the so-called "dry processes," are dark-colored and impure and unfit for any purpose until they have been resmelted or resublimed to rid them of the impurities which they contain. Hitherto no other methods have been used for refining these products, except the usual ones of resubliming and resmelting in furnaces of various kinds, and these methods of refining have been expensive and tedious, owing to the bulky and light nature of the substance operated upon. It has also been difficult to obtain pigment of uniform quality by these processes of refining. My invention is founded upon the fact that when such fume is collected comparatively free from extraneous matter—as sand, grit, ash, iron rust, &c.—and is then subjected to a constant degree of heat out of contact with the products of combustion and in contact with a moving body of metal, and in the presence of air, and is then suddenly cooled by ejecting it into the open air or otherwise, the fume becomes white, dense, and soft, and it is found to be free from the volatile sulphur compounds, acids, carbonaceous matter, and such volatile metals as selenium, arsenic, &c. The fume thus treated is fitted for a pure white pigment, has great covering power, and possesses great stability as to color, while it is condensed to one-fourth to one-eighth of its original bulk.

I illustrate in the accompanying drawings apparatus which I preferably use to carry out my invention.

In the drawings, Figure 1 represents a central longitudinal section through my apparatus. Fig. 2 is a section showing detail of feeding screw or worm.

A represents a furnace or kiln composed of brick or other suitable material, having a suitable hearth at one end. A closed chamber of considerable length leads horizontally from the hearth C to the end of the furnace, where it connects with an outlet-flue F. A tube D extends longitudinally through the chamber B, passing through the end walls of the furnace. One end of the tube D is open, and the other is connected with the bottom of a hopper G. A screw or worm E, in the form of a helix, extends through the tube D. This helix E is made, preferably, of iron, and may be either cast or wrought. The form here shown consists of a flat bar twisted to form a helix, and having an opening longitudinally through the center, as clearly shown in Fig. 2.

Connected with the end of the screw E is a shaft and pulley H or other suitable means of rotating it. An outlet pipe or flue D', for carrying off the air, connects with the tube D.

I is a hood which covers the top of the furnace, and I' an outlet for the same.

In using my apparatus I place the fume to be whitened and condensed in a hopper G, and slowly rotate the screw E by means of the pulley H, having previously started a fire on the hearth C. The fume is fed slowly along the tube D by the motion of the screw, and is subjected during its progress to the heat of the fire, which is kept as nearly as may be at a constant temperature. I secure the best results by keeping the temperature of the fume below 1,000° Fahrenheit. As the fume is fed along it is continually agitated and mixed by the action of the screw, and at the same time it is subjected to a moderate degree of heat, as specified, and to the oxidizing action of a current of air, which is constantly drawn or forced in and which comes in contact with all the particles of fume. When the advancing stream of fume reaches the end of the tube, it is allowed to fall into the open air, whereby it is suddenly cooled, or it may be cooled in any other suitable manner. It may be said that the quicker the hot fume is cooled the more perfect will be the product. The fume is so fed to the screw that it passes through in a comparatively thin stratum, whereby it is uniformly subjected to the heat of the fire and to the action of the air.

The ordinary reverberatory, muffle, hearth, and mechanical furnaces cannot be used in this process, since it is necessary that each atom shall be subject to an even degree of heat, and also that it shall be in constant motion; otherwise chemical changes take place which would ruin the color of the product.

Fume treated by my apparatus is rendered dense, fine, and white, as already pointed out.

The operation of the apparatus is purely automatic and requires no care beyond the care of the fire. It is desirable that the fume shall be promptly discharged when it has been in contact with the heated surface of the helix for a proper length of time; otherwise it hardens and loses its fine and soft texture.

I claim—

The herein-described apparatus for refining fume, which consists of an elongated chamber or tube having its lower portion cylindrical, a furnace for heating the same, and a coreless helical screw within said tube adapted to rotate relative thereto and composed of a coiled bar having an outer spiral edge adapted to come in direct contact with the cylindrical bottom of said tube, substantially as shown.

In testimony that I claim the foregoing as my own I have affixed my signature in presence of two witnesses.

FRANK L. BARTLETT.

Witnesses:
S. W. BATES,
C. SEVERANCE.